Dec. 3, 1968   KIMIO TAKAHASHI ET AL   3,413,779
ELECTRIC CLEANER

Filed Dec. 13, 1966   6 Sheets-Sheet 1

INVENTORS
KIMIO TAKAHASHI
IKUO KOIKE
KOUICHI SAGAWA

BY  Paul M. Craig, Jr.
ATTORNEY

United States Patent Office 3,413,779
Patented Dec. 3, 1968

3,413,779
ELECTRIC CLEANER
Kimio Takahashi, Ikuo Koike, and Kouichi Sagawa, Hitachi-shi, Japan, assignors to Hitachi, Ltd., Tokyo, Japan, a corporation of Japan
Filed Dec. 13, 1966, Ser. No. 601,406
Claims priority, application Japan, Apr. 4, 1966, 41/30,133
11 Claims. (Cl. 55—272)

ABSTRACT OF THE DISCLOSURE

An electric vacuum cleaner including a fan in the upper portion of the main body of the cleaner for producing a flow of air between a suction inlet and an exhaust outlet through a dust collecting chamber formed in the lower portion of the main body of the cleaner, a first filter mounted in the dust collecting chamber in a dust case which is slideably received therein and which communicates with the suction inlet, said first filter extending horizontally across said dust case and spaced vertically above the bottom thereof, and a second filter located above said first filter in contact with power driven dust removing means.

---

The present invention relates to an electric cleaner and more particularly to an improvement of the conventional electric cleaners.

When an electric cleaner in general is used for an extended length of time, clogging of the meshes of the cloth filters by the dust collected on these filters often occurs. As a result, the suction of the cleaner becomes reduced unless the dust deposited on the face of the filters is removed by some appropriate means. For this reason, electric cleaners of the prior art frequently required a dust-removing operation during cleaning.

As a means of reasonably removing the dust collected on the face of the cloth filter of an electric cleaner, U.S. Patent No. 3,236,032 proposes a method for removing the dust collected on the face of a cloth filter by the use of a dust removing member which operates so as to successively widen the mesh of the cloth on the side reverse of the face on which dust is deposited.

This system permits an effective removal of particularly fine dust, such as sand or small particles, among the dust that has been collected on the face of the cloth filter, but such dust as flue or bits of down tend to become caught in the mesh of the cloth filter and they are not easily removed therefrom.

While dust such as flue or bits of down does not substantially affect the suction quality of a cleaner even when a large amount of flue is collected on the face of the cloth filter, it is accumulated in the dust collecting chamber in a bulky mass. For this reason, electric cleaners of the prior art have been designed so that the main body of the cleaner is to be demounted for each dust removing operation to take the cloth filter outside the cleaner and to thereby remove the dust remaining on the face of the cloth filter, and this arrangement of the mechanism of electric cleaners of the prior art gave rise to problems such that it is quite troublesome to demount the main body of the cleaner frequently.

The present invention contemplates providing an electric cleaner which provides for improved operation while making the most use of the features of the dust removing means of an electric cleaner having such desirous features as have been described.

It is, therefore, an object of the present invention to provide an electric cleaner having the following structure and function so that relatively large dust such as flue or paper chips among all kinds of dust collected by the suction force of the fan means provided inside the main body of the cleaner is filtered by a first filter having a coarse mesh and then the dust that has passed through the mesh of the first filter cloth is again filtered by a second filter made of a cloth, said first filter being adapted to be easily taken outside the main body of the cleaner, and that a dust removing means which is adapted to operate so as to widen the mesh of the second cloth filter on the side reverse of the face on which dust is collected is provided, whereby the removal of the dust collected on the face of the second filter is carried out effectively by the driving of the dust removing means, without requiring the procedure of disassembling the main body of the cleaner for this particular purpose.

Another object of the present invention is to provide an electric cleaner in which a detachable dust case is provided inside the dust collecting chamber, whereby the dust collected in the dust collecting chamber by the action of the dust removing means can be disposed of easily in such manner as will satisfy the hygenic requirements.

Still another object of the present invention is to provide an electric cleaner which is of an increased dust collecting capacity and is effected by the arrangement of the structure which is operative in such manner that the dust sucked together with an air current into the dust case is collected in the bottom of this case while being compressed by virtue of the pressure of said air current.

Yet another object of the present invention is to provide an electric cleaner which is provided with a shutter mechanism at the upper portion of the dust case for opening and closing said upper portion, said shutter mechanism is operative in such manner that when it is intended to discard the dust collected in the dust case, the dust is prevented from scattering outside said dust case, whereby the dust contained in the dust case can be brought to a predetermined discarding place while satisfying the hygienic requirements.

A further object of the present invention is to provide an electric cleaner which is operative in such manner that the rotation of the electric motor for driving the fan means is electrically controlled in such fashion that changeover between high speed rotation and low speed rotation can be made as desired, whereby during the high speed rotation, ordinary cleaning operation is performed, and during the low speed rotation, the shaft of the electric motor is coupled to the dust removing means by the use of a clutch mechanism which is adapted to connect said electric motor and said dust removing means, whereby the operation of the cleaner is automatically shifted to dust removing of the second filter.

A still further object of the present invention is to provide an electric cleaner wherein an electric motor for high speed rotation and an electric motor for low speed rotation which are both adapted to be controlled by the changing of an electric circuit are provided inside the main body of the cleaner so that the electric motor for high speed rotation is driven to rotate the fan means so as to perform ordinary cleaning operation, while the electric motor for low speed rotation is rotated to drive the dust removing means to automatically and efficiently remove the dust collected on the face of the second filter.

Another object of the present invention is to provide an electric cleaner provided with a timer which is adapted to perform the changeover of operation of an electric circuit and which is used to set the duration of the dust removing operation conducted by the dust removing means which is adapted to be driven automatically to thereby simplify the operation procedures.

Still another object of the present invention is to provide an electric cleaner in which the casing which forms the dust collecting chamber is of a dual wall structure comprising an outer peripheral wall and an inner peripheral wall so as to form an annular space therebetween in such manner that the exhaust outlet of the cleaner body and the outlet of the fan means communicate with each other by the intervention of said annular space, whereby the noise of the motor and the fan is substantially arrested.

The present invention will now be described in detail with respect to some of the embodiments by referring to the accompanying drawings, in which:

FIGS. 8 and 9 show the relationship between a timer and its indicator board as viewed from the direction of P in FIG. 1, during the dust removing operation and the cleaning operation, wherein FIG. 8 is a schematic diagram showing the state of the timer during the period of cleaning operation, while

FIGS. 10 and 11 are cross sectional views of an eccentric cam and an intermediary rod taken along the line X—X in FIG. 1, showing their operating state during the dust removing period and during the cleaning period, wherein FIG. 10 is a schematic representation of the state of the eccentric cam and the intermediary rod during the period of cleaning operation, while

It is to be understood that like parts in the drawings are indicated by like reference numerals for the convenience of description.

Description will first be made on one embodiment of the electric cleaner of the present invention, with reference to FIGS. 1 through 12, which is so designed that the electric motor for driving a fan means is adapted to be electrically controlled so that the speed of said electric motor can be changed in the range from high speed rotation to low speed rotation and vice versa, to utilize the low speed rotation of the motor for the autmatic driving of the dust removing means.

Figure 1:
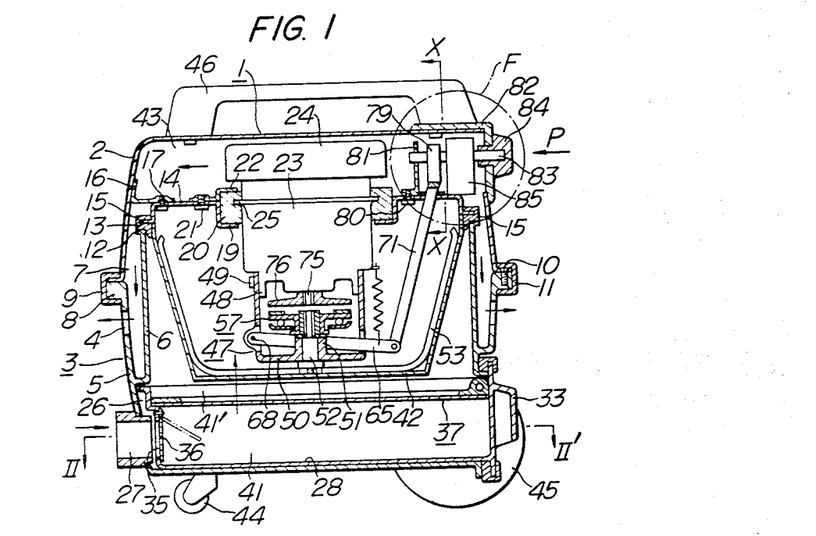
FIG. 1 is a longitudinal cross sectional view of an electric cleaner showing one embodiment of the present invention.

The main body 1 of the cleaner is divided into an upper casing 2 and a lower casing 3. The casing 3 has a dual wall structure in the portion of said casing extending upwardly from substantially the middle portion thereof, said dual wall structure comprising an outer peripheral wall 5 having several exhaust outlets 4 and an inner peripheral wall 6 having a diameter which is smaller than that of the outer peripheral wall 5 and projecting upwardly and extending from the outer peripheral wall 5 and inside of said outer peripheral wall 5 in a cylindrical shape. An annular space 7 is formed by the outer peripheral wall 5 and the inner peripheral wall 6. An annular receiving portion 8 is formed at the uppermost edge of the outer peripheral wall 5 so as to protrude outwardly. On this annular receiving portion 8 is mounted an annular flange portion 9 of the upper casing 2, said annular flange portion 9 being formed by bending the lower edge of said upper casing 2 outwardly in the horizontal direction. Said annular flange portion 9 is securely attached to said annular receiving portion 8 of the lower casing 3 by means of a screw 10. A resilient bumper 11 is mounted onto the joint between the annular receiving portion 8 and the annular flange portion 9 so as to seal said joint portion from outside.

The uppermost free end of the inner peripheral wall 6 is bent outwardly and in the horizontal direction to form an annular receiving portion 12. On this annular receiving portion 12 is placed, through the intervention of an annular packing 15, an annular flange portion 13 of a partition plate 14, said annular flange portion 13 being formed by bending the outer free end portion of the partition plate 14 in the downward vertical direction and then outwardly in the horizontal direction. Said annular packing 15 is made of a material having the property of resilience, for example, such as a rubber. A second filter 42 made of a flexible cloth is attached to the inner peripheral edge of said annular packing 15. Said annular packing 15 is mounted on said annular flange portion 13 of the partition plate 14.

Said partition plate 14 is attached, by means of a screw 17, to each of a plurality of supporting metal fittings 16 which are fixed to the internal periphery of the upper casing 2 by welding or like techniques. Said partition plate 14 is mounted under pressure on the annular receiving portion 12 of the inner peripheral wall 6 of the lower casing 3 by placing the upper casing 2 and the lower casing 3 together with screws. An opening is formed in the central portion of said partition plate 14 for receiving a fan means 18 therethrough. The inner free end portion of the partition plate 14 adjacent to said opening is bent vertically downwards and then in the horizontal direction to form an annular receiving portion 19. On this annular receiving portion 19 of the partition plate 14 is mounted an anti-vibration rubber member 20 for resiliently supporting the fan means 18. The upper face of the anti-vibration rubber member 20 is supported further by a pressing plate 22 which is securely attached to said partition plate 14 by a screw 21.

Figure 2:
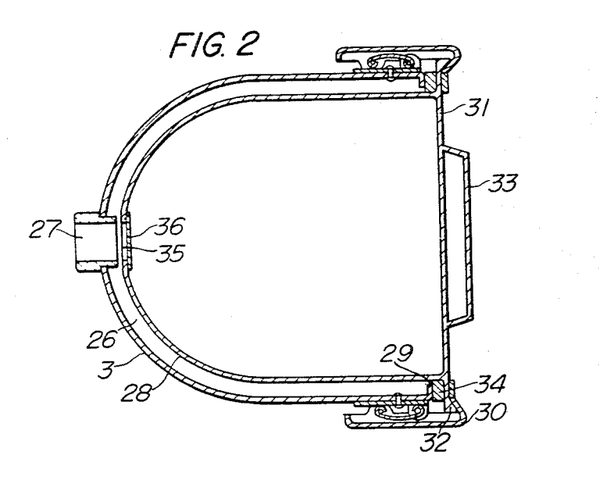
FIG. 2 is a cross sectional view taken along the line II—II in FIG. 1.

The fan means 18 which is contained in the main body 1 of the cleaner is of a structure which is widely used in general, and is comprised of two sections, i.e. a lower section which comprises an electric motor 23 which is of the type that the rotation speed thereof can be changed stepwise to two levels, namely, high speed rotation and low speed rotation, and an upper section which comprises a fan 24. Furthermore, said fan means 18 has an annular protruding portion 25 which is formed on the trunk of the fan means. Said protruding portion 25 is inserted into the anti-vibration rubber member 20 so as to support the entire fan means 18 free from vibration. In the lower portion of said lower casing 3 is formed a dust collecting chamber 26 having a closed substantially U-shaped configuration, as shown in FIG. 2. Said dust collecting chamber 26 is provided with a suction inlet 27 on one side and also with a detachment aperture 29 on the opposite side through which a dust case 28 is inserted and taken out. Said dust case 28 is adapted to be detachable from said dust collecting chamber 26. Said dust case in adapted to be normally placed inside the dust collecting chamber 26, with the clamping means 30 being fixed to the external wall of the lower casing 3 and engaging a stopper protrusion 32 provided on the side plate 31 of the dust case 28, while when it is intended to discard the collected dust, the dust case 28 is easily removed from the dust collecting chamber 26 by releasing the engagement between the clamping means 30 and the stopper protrusion 32.

Furthermore, the upper portion of the dust case 28 is open for receiving the dust sucked through the suction inlet 27, and the side plate 31 of the dust case 28 is provided with a grip 33 to facilitate the detachment of the dust case from the dust collecting chamber 26. Due to this arrangement, the disposition of the dust collected in the dust case 28 can be effected with ease and without the need of disassembling the main body 1 of the cleaner and in a manner which is satisfactory from the hygienic point of view. Around the periphery of said side plate 31 is provided a packing 34 for sealing the clearance between the dust case 28 and the aforesaid detachment aperture 29. An air inhaling inlet 35 which communicates with the suction inlet 27 is formed through the side wall of the dust case 28, and a valve 36 is mounted on the inner side of this air inhaling inlet 35 in such manner that the valve can be freely opened and closed. This valve 36 works so as to arrest the dust collected in the dust case 28 from being caused to flow backwards to be scattered outside the cleaner during the period that the fan means 18 is not in motion or during the period that the collected dust is discarded.

Figures 3, 4, 5, 6:
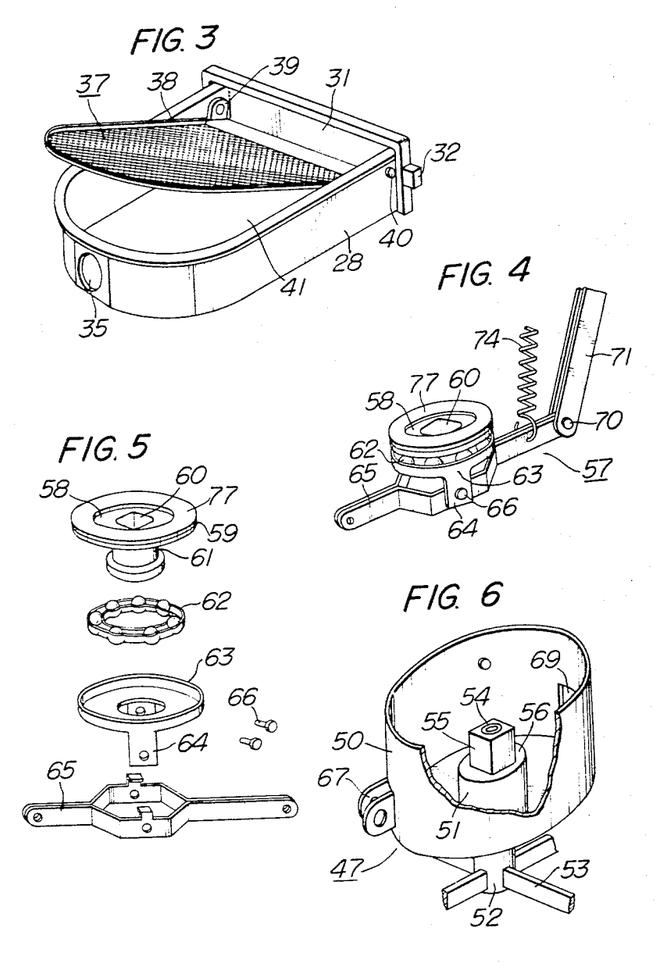
FIG. 3 is a perspective view of a dust case in its state of being detached from the dust collecting chamber.
FIG. 4 is a perspective view, on an enlarged scale, of the interlocking mechanism of a clutch section.
FIG. 5 is an exploded perspective view of the interlocking mechanism of the clutch section shown in FIG. 4.
FIG. 6 is a perspective view, partly broken away, of the supporting cylinder for supporting the dust removing members.
Figure 7:
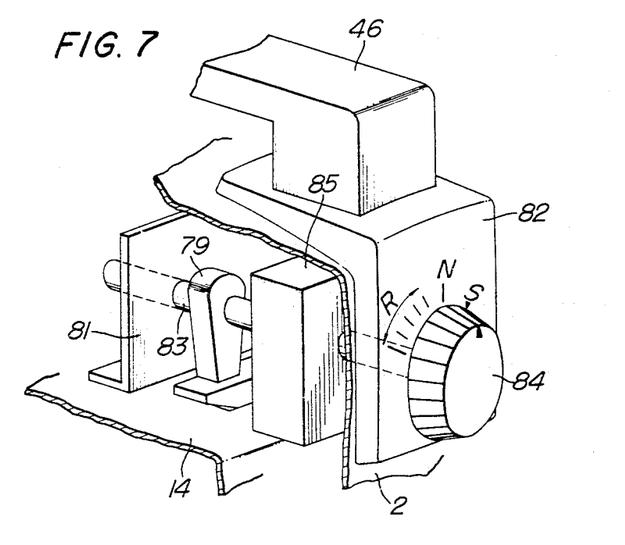
FIG. 7 is a perspective view, on an enlarged scale, of the portion in FIG. 1 which is encircled with a dash and dot line F.

A first filter 37, which is illustrated in detail in FIG. 3, is rotatably mounted on the upper portion of the side wall of the dust case 28 and this first filter 37 is comprised of a frame 38 and a net or the like having a relatively coarse mesh and is made of a metal wire or synthetic resin material, said net being securely attached to said frame. Said first filter 37 is mounted to the side wall of the dust case 28 in such manner that supporting portions 39 formed at the end portions of the frame 38 are pivotally supported by the side wall of the dust case 28 by the use of pins 40. The interior of the dust case 28 is divided into two sections with an appropriate space ratio by means of said first filter 37 so as to define a first dust collecting chamber 41 having the air inhaling inlet 35 on the side wall thereof and a second dust collecting chamber 41'. A second filter 42 made of a cloth and attached to the aforesaid annular packing 15 serves to filter the fine dust particles which are not filtered and collected by the first filter 37.

The operation of the cleaner will be described in further detail. By driving the electric motor 23, the fan 24 is rotated. Due to the rotation of the fan 24, dust is caused to be sucked together with the ambient air into the dust case 28 through the suction inlet 27 of the lower casing 3 and then through the air inhaling inlet 35 of the dust case 28. The first filter 37 of the dust case 28 operates in such fashion that the dust of relatively large size, for example, flue or bits of down, paper chips or small pieces of ferrous scraps, are collected in the dust case 28, by means of the pressure of the inhaled air, at the side wall of the dust case 28 located longitudinally in the far end relative to the air inhaling inlet 35 while compressing the dust against said side wall by the pressure of the inhaled air. The dust having a fine size that has passed through the first filter 37 is then collected by the second filter 42 which is also made of cloth. During the aforesaid operation, the air current containing dust pushes open the valve 36 which is provided on the air inhaling inlet 35 of the dust case 28 so as to be sucked into the interior of the dust case 28. The pressure of the air current produced by the fan means is quite intensive such that the dust of a relatively large size, such as the flue which is filtered by the first filter, is compressed against the side wall located in the far end portion of the dust case relative to the air inlet so that the dust will have an increased apparent specific gravity, and thus there is obtained an advantage and effect that the dust collecting case of the cleaner of the present invention has an increased dust collecting capacity as compared with the dust collecting cases of the same size of the conventional cleaners. The air current which has passed through the first filter 37 and the second filter 42 passes, as shown by the arrow in FIG. 1, through the fan means 18 and flows into an empty compartment 43 located in the upper portion of the upper casing 2, and therefrom the air passes through the annular space 7 of the lower casing 3 to be discharged from the exhaust outlet 4. The air current is discharged from the aforesaid exhaust outlet 4 after passing through the upper empty compartment 43 and then through the annular space 7, with a result that the flow velocity of the air current is reduced, and thus the air current can be converted to an exhausted air which is accompanied by substantially reduced noise. While auxiliary members such as a cleaning hose and suction mouthpiece are not illustrated in the drawings, it is to be understood that they are coupled to the aforesaid suction inlet 27. The main body 1 of the cleaner can be caused to move freely around to any desired direction on the floor only by pulling the cleaning hose which is attached to said suction inlet 27, and this movement in the desired direction is effected by the swivel wheels 44 which are provided at the bottom of the lower casing 3 and by the fixed wheel 45 having a diameter which is greater than that of the swivel wheel. When it is intended to transport the main body 1 of the cleaner manually, it is only necessary to grip the handle 46 which is provided on the upper face of the upper casing 2. To effect the dust deposited on the face of the second filter 42 to be detached therefrom following the completion of the cleaning operation, there is provided a dust removing means 47 between the second filter 42 and the aforesaid fan means 18 which are both located in the main body 1 of the cleaner. This dust removing means 47 is comprised, as shown in FIG. 6, of a supporting cylinder 50 which is attached, by means of a screw 29, to a protruding sleeve 48 which is formed on the lowermost end of the housing of the electric motor 23, a shaft 52 for dust removing members, said shaft 52 being rotatably supported in a bearing 51 which is provided centrally of the bottom of said supporting cylinder 50, and a plurality of dust removing members 53 which are provided at the lowermost end of said shaft 52 so as to extend radially therefrom in slidable contact with the entire length of the back face of the second filter 42, namely, the side which is reverse of the inner side on which dust is deposited.

As the mechanism for driving the dust removing members 53, a thread 54 is formed in the top of the shaft 52 which is intended for dust removing members and a square nut 55 is screwed into said threaded portion with a washer 56 being interposed between said nut and the top of the shaft 52. A motion receiving plate 58 which constitutes a part of a clutch mechanism 57 is mounted on said square nut 55 so as to make free vertical sliding movement. To describe the manner in which the motion receiving plate 58 is mounted on the square nut 55 in further detail, there is provided an anti-swivel mechanism, as shown in FIGS. 4 and 6, which comprises, for example, a combination of a square column and a square bore, a key or like structure, to insure that none of the constituting members of the anti-swivel mechanism are caused to move in the direction of rotation and this anti-swivel mechanism is adapted to make only vertical sliding movement. To this end, a square bore 60 for engagingly receiving the external periphery of the square nut 55 is formed in the cylindrical portion 59 of the motion receiving plate 58 so as to pass through the entire length thereof, and a shouldered groove 61 having a small diameter is formed on the external periphery of said cylindrical portion 59, and a receiving tray 63 for holding a ball 62 having a retainer is mounted on said shouldered groove 61. Said receiving tray 63 is provided with a pair of oppositely disposed legs at the inward edge of the tray which forms the inner diameter of the tray. These legs are attached, by pins 66 for pivotal movement, to an operating lever 65 which is disposed inside the supporting cylinder 50. The operating lever 65 is pivotally supported at one end thereof in a bearing 67 provided on the external periphery of the supporting cylinder 50 by the use of a shaft 68. The other end of the operating lever 65 protrudes outwardly through an elongated aperture 69 which is provided in the side wall of the supporting cylinder 50. At the free end of said protruding lever 65 is provided an intermediary rod 71 which is connected thereto by means of a pin 70. The other end of the intermediary rod 71 passes through a slit 72 formed through the partition plate 14 leaving some clearance between the internal edges of the slit and the periphery of the intermediary rod 71. Said intermediary rod 71 is provided, at the upper portion thereof, with a packing 73 for closing the slit 72 during the period of the cleaning operation. Furthermore, a spiral pulling spring 74 which is attached at one end thereof to the housing of the electric motor 23 is provided on the aforesaid operating lever 65 at an appropriate point of the length of the lever 65. By virtue of the elastic force of said pulling spring 74, the operating lever 65 is normally subjected to a rotating force in the counterclockwise direction in the drawings so as to urge the intermediary rod upwardly.

By this arrangement, the counter-clockwise rotation of the operating lever which is effected about the shaft 68 causes the receiving tray 63, which is attached thereto, to be pushed upwardly while guiding the square nut 55 which is attached to the receiving tray 63, with a result that the motion receiving plate 58 is brought, with the intervention of the ball 62 having a retainer, into contact with a driving plate 76 which is fixed to a motor shaft 75 of the electric motor 23. A friction plate 77 is fixed to the face of the motion receiving plate 58. During the period of contact with the driving plate 76, the produced frictional resistance acts in such manner that the driving force of the electric motor 23 is smoothly transmitted, in the following order and in succession, to the motion receiving plate 58, the shaft 52 for dust removing members, and the dust removing members 53. The operating lever 65 is pivotally coupled to the receiving tray 63 because it is intended to prevent, by this arrangement, the occurrence of unbalanced wear of the faces of the driving plate 76 and the friction plate 77 by insuring, by said arrangement, that even when the driving plate 76 is attached with an inclination relative to the motor shaft 75 of the electric motor 23, the friction plate 77 will contact, in parallel, with the inclined face of the driving plate 76. Also, the interposition of the ball 62 having a retainer between the receiving tray 63 and the motion receiving plate 58 is based on the consideration to reduce the friction due to contact between the rotary section and the fixed section to thereby minimize the resulting mechanical loss and also to effect a smooth transmission of the driving force.

As has been described, there is provided a dust removing means 47 which is operative so as to forcibly widen the mesh of the cloth of the second filter 42 on the side reverse of the face on which dust is deposited, whereby the cleaner can be placed in continuous operation without the troublesome procedure of demounting the main body 1 of the cleaner to manually remove the dust deposited on the face of the second filter, but instead, the removing operation is effected automatically with satisfactory efficiency.

Figure 8:
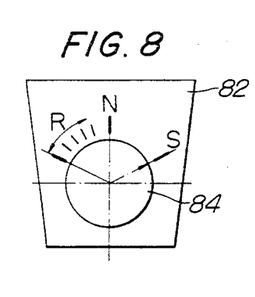

As a means to impart rotation to the operating lever 65, there is provided an eccentric cam 79 which is normally held in contact with a contacting portion 78 provided on the top of the intermediary rod 71. This eccentric cam 79 is mounted on a main shaft 83 rotatably provided in a shaft receiving plate 81 which, at one end thereof, is attached to the partition plate 14 by means of a screw 80 and also in the indicating plate 82 which is fixed to the outer face of the upper portion of the upper casing 2. An operating knob 84 is fixed to the other end of the main shaft 83, said operating knob 84 protruding outwardly from the face of the upper casing 2 and also from the indicating plate 82 which is located on said face of the upper casing 2. The eccentric cam 79 is adapted to be rotated through the main shaft 83 by rotating said operating knob 84. The rotational action is transmitted to the intermediary rod 71, the operating lever 65, and then to the clutch mechanism 57. A means for controlling the dust removing time which cooperates with the eccentric cam 79 and a timer 85 for effecting the changeover of the electric circuit are provided on the main shaft 83. When the timer 85 is not actuated, or in other words, when the electric motor is in its resting state, the eccentric cam 79 normally is located at the position shown in FIG. 10, while the indicating arrow given on the face of the operating knob 84 points at the position S on the indicating board 82 as is shown in FIG. 8. In this state, the contact I of the contacts which are disposed within the timer 85 is actuated. In this state of contact, the eccentric cam 79 works so as to push, through the intermediary rod 71, the operating lever 65 downwardly against the elastic force of the pulling spring 74, whereby the connection of the clutch mechanism 57 is released.

Accordingly, by closing a remote control switch 86 which is intended for operating the cleaner at a distance therefrom, a relay 87 is actuated to form a circuit for high speed rotation of the electric motor 23. As a result, the electric current coming from a power source 88 is supplied directly to the electric motor 23, which is then rotated at a high speed and as a consequence, dust is sucked with an intensive suction force.

When there occurs a reduction in the suction force after the completion of the cleaning operation or due to substantial increase in the amount of the accumulated dust in the dust collecting chamber, the operating knob 84 is rotated counter-clockwise by a degree of $(\beta+\theta)$. Then, by the rotation of the eccentric cam 79 which cooperates with this knob 84 up to the position indicated by the dash line in FIG. 11, the intermediary rod 71 is pulled upwardly by the elastic action of the pulling spring 74. The operating lever 65 which is coupled to said intermediary rod 71 places the clutch mechanism 57 in the connected state, and as a result, the low speed rotation of the electric motor is transmitted to the dust removing members 53, whereby the dust which is attached to the surface of the second filter 42 is automatically removed.

Figure 12:
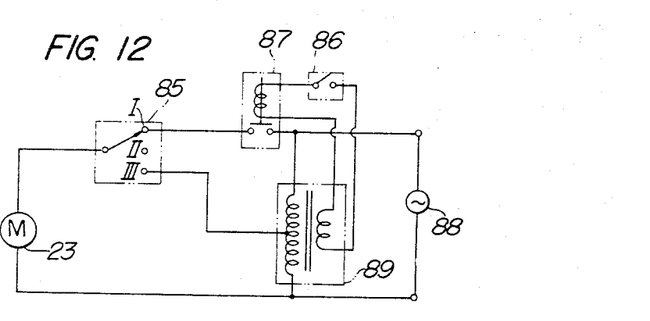
FIG. 12 is a schematic diagram of an electric circuit used in the electric cleaner in FIG. 1.

In this operation, the setting of the timer 85 is changed over to the contact III, whereby the voltage which is applied to the electric motor 23 is lowered, as is noted from the electric circuit shown in FIG. 12, by the primary coil of the transformer 89 for lowering the voltage, and as a consequence, the speed of the rotation of the electric motor 23 is changed over to a low speed suitable for the dust removing operation, and the dust removing members 53 are rotated at such a low speed.

When the timer 85 is rotated through an angle of $\theta$, there is accumulated a restoring force in the spring (not shown) which is housed within the timer 85. The contacting portion 78 of the intermediary rod 71 is still not in contact with the eccentric cam 79 within the range of the angle $\theta$, then there is applied a force to advance the position of the timer 85 as well as the operation of knob 84 and the eccentric cam 79 by the angle $\theta$, and thus the timer produces, in the dust removing time, a period of rotation so as to be rotated by the amount of angle R. Arrangement is given so that a further restoring force by the amount of angle $\theta-R=\alpha$ is held, and thus when the timer has restored by the amount of angle R, the contact in the timer is changed from on the contact III to the contact II to open the dust removing circuit to thereby complete the dust removing operation. By arranging it so that the timer is thereafter restored further, after a lapse of a predetermined length of time, by the amount of angle α from the actuated state of the contact II, the dust suspended in the space in the dust collecting chamber 26 becomes settled.

On the other hand, three kinds of marks "S," "N" and "dust removing time" such as "5 seconds," "10 seconds" and "15 seconds" are placed on the face of the indicating board 82 of the operating knob 84. By such arrangement, when the arrow of the operating knob 85 points at "S," or in other words, when it is in the state shown in FIG. 8, this relative position indicates that the cleaner is either in the cleaning state or in the state ready for starting the cleaning operation.

Figure 9:
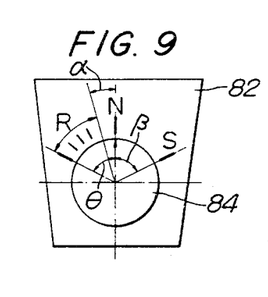
FIG. 9 is a schematic representation of the state of the timer during the period of dust removing operation.
Figure 10:
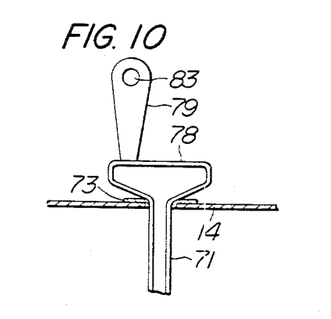
Figure 11:
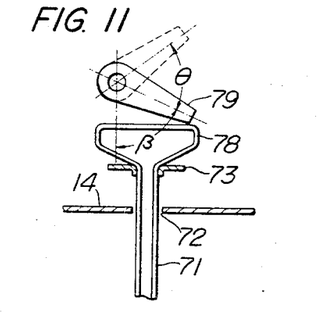
FIG. 11 is a schematic diagram showing the state of the same during the period of dust removing operation.

In case the arrow of the operation knob 84 points at "N," or in other words, when the knob is in the state shown in FIG. 9, one is able to know that the dust removing operation has been completed. Also, when the operating knob 84 is rotating on the time graduations within the range of the angle R, it means that the dust removing operation is underway. Therefore, when the user intends to have the cleaner perform dust removing operation, it is only necessary for him to turn the operating knob 84 so that the arrow thereon is shifted from the mark "S" until it is in register with the desired time graduation within the angle of R. This procedure will cause the clutch mechanism 57 to be placed in the connected mode, and at the same time will give a restoring force to the timer 85, and further will change the voltage control circuit to a phase in which the rotation of the electric motor 23 is shifted to a low speed rotation which is suitable for removing the dust. Furthermore, after a lapse of a predetermined length of time (during which period the operating knob 84 will rotate by an angle R), the electric motor 23 will be caused to stop automatically, and after the following several seconds (during which period the knob 84 is rotated by an angle α), the operating knob 84 is caused to stop at the position of the mark "N" to inform that the dust removing operation is completed. Therefore, when the dust case 28 is thereafter withdrawn from the dust collecting chamber 26 of the lower casing 3, the suspended dust will be found to have already settled in the case, and as a consequence, discarding of the dust can be easily performed so as to meet the hygienic requirements.

In order to shift the mode of the cleaner from the state of completed dust-removing operation to the cleaning state, it is only necessary to return the operating knob 84 from the position at the mark "N" to the position indicated by the mark "S" on the indicating board 82. In other words, by rotating the operating knob 84 through an angle β as shown in FIG. 9, the eccentric cam 79 which cooperates with said knob 84 will cause both the intermediary rod 71 and the operating lever 65 to be pushed downwards, to thereby release the connection of the clutch mechanism 57.

Simultaneously with this, the movable contact housed within the timer is shifted from the contact II to the contact I. The operation of this changeover procedure is performed manually.

Figure 13:
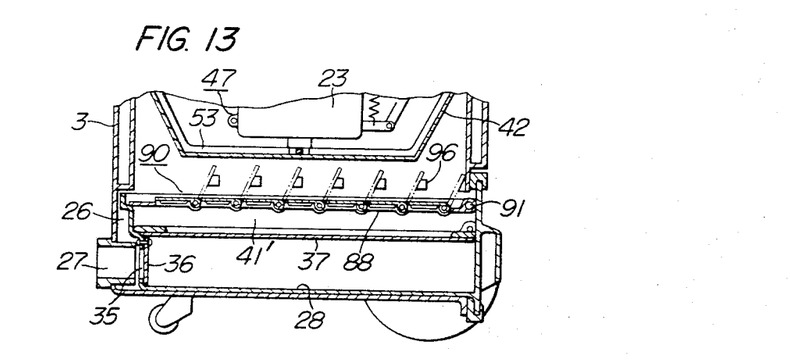
FIG. 13 is a longitudinal cross sectional view of a dust collecting chamber of an electric cleaner showing another embodiment of the present invention.
Figure 14:
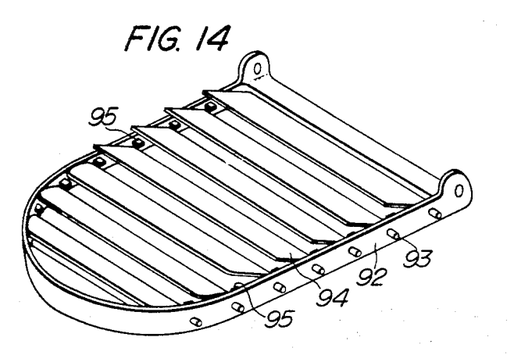
FIG. 14 is a perspective view of a shutter mechanism used in the dust collecting chamber in FIG. 13.

FIGS. 13 and 14 represent the dust collecting chamber of an electric cleaner showing another embodiment of the present invention.

In the dust case 28 which is provided in the dust collecting chamber 26 of the lower casing 3, is provided a shutter mechanism 90 which is disposed above the first filter 37. The dust consisting of fine particles attached to the face of the second filter 42 is caused, by the dust removing means 47, to drop in the second dust collecting chamber 41' which is formed above the first filter 37. For this reason, the shutter mechanism 90 is intended for the prevention of the dust accumulated in the second dust collecting chamber 41' from being scattered around when the dust case 28 is withdrawn from the lower casing 3 and also when said dust case 28 is thereafter carried by the user to a place where said dust is discarded.

The shutter mechanism 90 will be described in further detail. A shutter frame 92 which is rotatably attached, at one end thereof, to the upper side wall of the dust case 28 by means of pins 91 is provided with a plurality of shutter blades 94 each having a shaft extending in the longitudinal length of said blade and protruding beyond the marginal edges at the opposite ends of the longitudinal length of the blade, said shutter blades 94 being disposed at uniform intervals relative to each other, and being pivotally supported by said shutter frame. Stopping strips 95 are fixed on the internal peripheral wall of the shutter frame 92 so as to hold the shutter blades 94 in their horizontal state when the shutter blades 94 are closed. These shutter blades 94 are rotated about their protruding shafts 93 by the pressure of the air current which is fluidized through the suction inlet 27, the valve 36, the first filter 37 or the like parts to thereby effect pivotal movement so as to open in the upper portion of the dust case 28. A plurality of stopping strips 96 are provided on the internal peripheral wall of the lower casing 3 to prevent the shutter blades 94 from making an excessive rotation, when they are rotated in the opening direction, beyond the position indicated by a dash line in FIG. 13. At the time of discarding the dust collected, it is only necessary to withdraw the dust case 28 from the dust collecting chamber 26. By this action, the upper portion of the shutter blades 94 are brought into contact with the internal wall of the lower casing 3 with a result that the shutter blades 94 are caused to rotate counterclockwise so as to inevitably tend to assume a posture to cover the upper portion of the dust case 28.

As such, when the dust case 28 is carried by the user to a place where the dust is discarded, the dust contained in said case 28 is not caused to rise and escape from the case 28 during the transportation, and thus the user can carry the dust-containing case 28 to a predetermined place to dispose of the contact in such manner as to meet the hygienic requirements.

Figure 15:
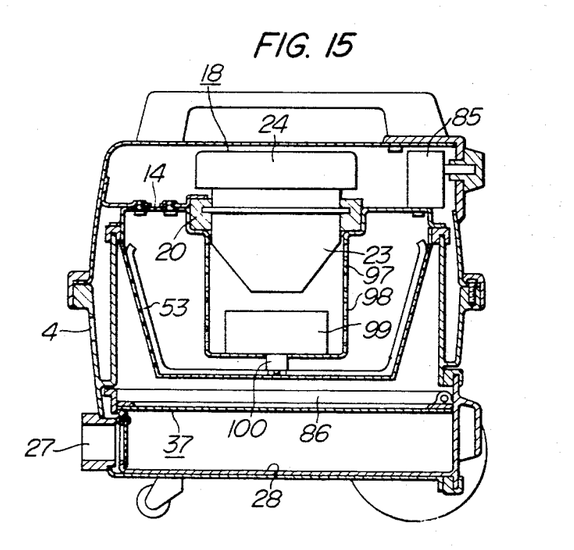
FIG. 15 is a longitudinal cross sectional view of an electric cleaner showing still another embodiment of the present invention.
Figure 16:
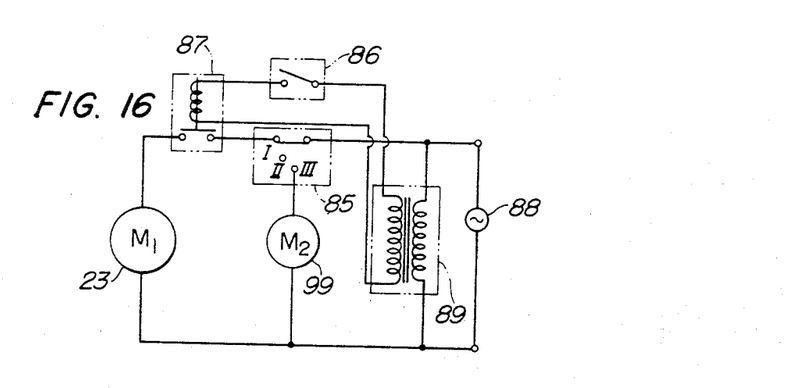
FIG. 16 is a schematic diagram of an electric circuit used in the electric cleaner in FIG. 15.

FIGS. 15 and 16 show still another embodiment of the present invention. This embodiment discloses a simplified arrangement of the cleaner by the provision of an electric motor for the exclusive use in the driving of the dust removing means. In this arrangement, the partition plate 14 which resiliently supports the fan means 18 has a substantially U-shaped cylindrical portion 97 which is formed integrally with said partition plate 14 so as to cover the portion of the electric motor 23 which is intended for driving the fan means 18.

This cylindrical portion 97 has a number of air-passage holes 98 which are formed through the side face of the cylindrical portion 97. On the bottom of the cylindrical portion is mounted an electric motor 99 for driving the dust removing members. Dust removing members 53 are directly attached to the motor shaft 100 of said electric motor 99 which is rotated at a low speed suitable for the dust removing operation. The low speed rotation of the electric motor 99 is effected, as shown in the schematic representation of the electric circuit in FIG. 16, by the changeover of the connection of the electric circuit which is effected by the shifting of the position of the timer 85. Therefore, by subjecting only the dust removing members 53 to low speed rotation by the use of this electric motor 99, a clutch mechanism 57 and the associated interlocking mechanism (in the previous embodiment this is represented by an operating lever 65, an intermediary rod 71, an eccentric cam 79 or the like) becomes unnecessary, and a substantial simplification of the structure is realized.

Figure 17:
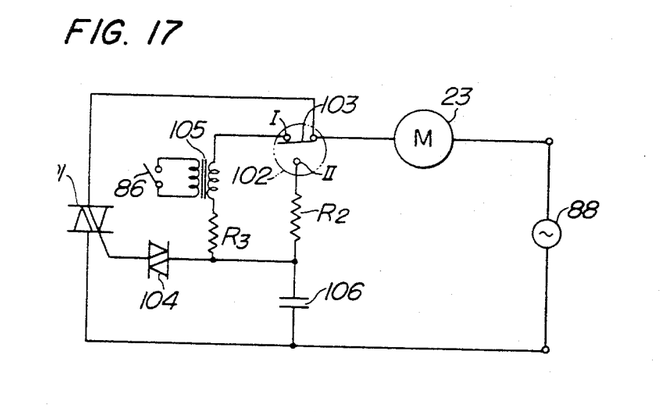
FIG. 17 is a schematic diagram of an electric circuit showing another embodiment.

FIG. 17 is a schematic representation of an electric circuit of another embodiment of the present invention. An electric motor 23 and a silicon gate-controlled AC switch 101 (hereinafter to be referred to simply as FLS) is connected in series to a power source 88. Also, a movable contact 103 of a high speed-low speed changeover switch 102 is provided between the electric motor 23 and the FLS 101. A contact I of the high speed side and a contact II of the low speed side are provided so as to face said movable contact 103. Furthermore, a bidirection actuating element 104 (hereinafter to be referred to briefly as BiAc) is provided on the gate of said FLS 101. Between this BiAc 104 and the contact I and the contact II of the switch 102 is provided the primary side of the transformer 105 which comprises a series circuit and a resistor $R_3$ and another resistor $R_2$ which comprises a circuit which is parallel to them. A remote control switch 86 is connected to the secondary side of the transformer 105. Moreover, between the cathodes of said FLS 101 and said BiAc 104 is provided a condenser 106. Said switch 102 is disposed within the timer 85 and is adapted to cooperate with the action of the operating knob 84.

In order to operate the electric motor 23 to rotate at a high speed in the aforesaid arrangement, the operating knob 84 is rotated first so as to close the switch 102 which is disposed inside the timer 85 on the side of the movable contact I, while the remote control switch 86 is closed to thereby supply the electric current to the resistor $R_3$ and to the condenser 106. With this, the condenser 106 is started to be charged, and when the charge reaches the break-over voltage of BiAc 104, the electric charge discharged from the condenser 106 actuates the FLS 101 via the BiAc 104 to thereby rotate the electric motor at a high speed. Accordingly, the fan 24 is rotated at a high speed and the suction force produced by the rotation of the fan 24 causes the dust to be inhaled together with the air current, thereby the general cleaning operation is accomplished.

When the inhaled dust is accumulated on the meshes of the first filter 37 and the second filter 42 to cause the clogging of the meshes and a reduction in the suction force, however, there arises a necessity for the dust removing means 47 to be driven, and therefore, description will now be directed to the dust removing operation. The operating knob 84 is operated so as to shift the connection of the movable contact 103 of the switch 102 housed in the timer 85 onto the contact II.

Along with this operation, the eccentric cam 79 is rotated, so that the clutch mechanism 57 is placed into connected mode through the actions of the intermediary rod 71 and the operating lever 65.

On the other hand, by the closing of the circuit including the electric motor 23, the resistor $R_2$, the condenser 106 and the power source 88, the electric motor 23 on this circuit is rotated. In this instance, the operating time of FLS 101 is reduced by virtue of the resistor $R_2$ and the voltage applied to the electric motor 23 is lowered so that the electric motor 23 is rotated at a low speed which is suitable for the dust removing operation. According to this arrangement, such mechanical contact as the relay 87 which is used in the previous embodiment is omitted, and therefore, the life of the cleaner is extended, and also the circuit itself is simplified.

As has been described, according to the present invention, the dust which is inhaled together with an air current is adapted to be sorted by the first filter which is provided in the dust case and also by the second filter which is disposed within the main body of the cleaner, as it is collected. Therefore, the present invention features in that the dust collecting rate or the dust collecting ability of the electric cleaner is markedly improved.

According to the present invention, the dust deposited on the second filter can be detached from said filter by automatically rotating the dust removing means without the need of withdrawing said second filter outside the main body of the cleaner, and the detached dust is received, before being discarded, in the dust case which is adapted to be freely withdrawn from the cleaner.

Therefore, it is a further feature of the present invention that it materializes rapid disposition of the collected dust and that this dust disposing procedure meets the hygienic requirements, and further that the dust removing operation is simplified.

What is claimed is:

1. An electric vacuum cleaner comprising a main body having a substantially vertically extending side wall, fan means mounted within an upper portion of said main body and a dust collecting chamber formed in a lower portion of said main body, a suction inlet provided in said side wall and located in the lower portion of said main body, a detachment aperture provided in said lower portion of said main body, an exhaust outlet provided in said side wall and located above said inlet and said detachment aperture and downstream of said fan means, a first filter mounted in a dust case, said dust case being disposed within said dust collecting chamber, a second filter having an upper face and being located above said first filter and above said suction inlet, and disposed within said main body between said dust case and said fan means, and dust removing means provided between said second filter and said fan means and being urged against the upper face of said second filter, power means for driving said dust removing means slideably over the upper face of said second filter provided inside said main body for cleaning said second filter, said dust case being slideably received in said detachment aperture, said first filter extending horizontally across said dust case and spaced vertically above the bottom of said dust case, said inlet fluidly communicating with said dust case between said first filter and the bottom of said dust case.

2. An electric cleaner according to claim 1, said cleaner further comprising an air inlet provided in said dust case in communication with the suction inlet of the main body of the cleaner, a valve mounted on the inner side of said air inlet and adapted to arrest the back flow of the collected dust, said first filter being mounted in the upper portion of said dust case to form one wall thereof.

3. An electric cleaner according to claim 2, wherein said air inlet is provided in a side wall of said dust case so that the air current sucked through the suction inlet of the main body of the cleaner is led along the bottom face of said dust case to the side wall of the latter.

4. An electric cleaner according to claim 2, wherein said cleaner further comprises a shutter mechanism provided on the dust case above said first filter and being rotatable to an open position by the suction force of the fan means and rotating to a closed position in the absence of the suction force of the fan means so that at the time of discarding of the collected dust the dust is prevented from being scattered.

5. An electric cleaner according to claim 1, wherein said cleaner further comprises an annular inner peripheral wall having a free end branching from said side wall between said suction inlet and said exhaust outlet and extending upwardly inside said side wall with said free end supporting said second filter and forming an annular space together with said side wall, with the outlet side of said fan means being in communication with said exhaust outlet through said annular space.

6. An electric cleaner according to claim 1, said fan means includes a fan, a motor for driving said fan and control means for effecting changeover between high speed rotation and low speed rotation of said fan by electrically controlling the speed of rotation of the electric motor, and a detachable clutch mechanism for selectively connecting said dust removing means to said motor in response to actuation of said control means so that during said high speed rotation the cleaner is caused to effect cleaning operation while during the low speed rotation the driving force of said electric motor is transmitted to the dust removing means.

7. An electric cleaner according to claim 6, said cleaner further comprises a changeover means for effecting changeover between high speed rotation and low speed rotation by electrically controlling the rotation of the electric motor of said fan means, said changeover means being adapted to be operative in such manner that said electric motor of said fan means is directly connected to the power source, and also being adapted to connect said motor to the power source via the primary coil of the transformer which is intended for lowering the voltage used for remote control means.

8. An electric cleaner according to claim 7, wherein said control means further comprises timing means for controlling the driving timing of the dust removing means and means for indicating the operating state of said timer to the user.

9. An electric cleaner according to claim 7, wherein said control means further comprises timing means for setting the driving time of the dust removing means and an interlocking mechanism for simultaneously controlling the operation of said clutch mechanism with changeover of the speed of said motor.

10. An electric cleaner according to claim 9, wherein said control means further comprises means for indicating the operating state of said timer to the user.

11. An electric cleaner according to claim 1, wherein said cleaner further comprises an electric motor connected to said dust removing means and means for operating said electric motor.

References Cited

UNITED STATES PATENTS

| | | | |
|---|---|---|---|
| 2,211,934 | 8/1940 | McAllister | 55—429 X |
| 2,219,567 | 10/1940 | Spielman. | |
| 2,482,166 | 9/1949 | Gage | 55—297 |
| 2,534,578 | 12/1950 | Crabb. | |
| 2,664,646 | 1/1954 | Bourner | 55—429 X |
| 2,721,625 | 10/1955 | Lagestrom | 55—472 X |
| 3,236,032 | 2/1966 | Yasukawa et al. | 55—299 |

FOREIGN PATENTS

| | | |
|---|---|---|
| 614,754 | 2/1961 | Canada. |
| 698,817 | 11/1940 | Germany. |
| 254,781 | 1/1949 | Switzerland. |

OTHER REFERENCES

German printed application, 1,059,636, June 1959.

HARRY B. THORNTON, *Primary Examiner.*

D. TALBERT, *Assistant Examiner.*